United States Patent [19]

Miloscia et al.

[11] 4,239,864
[45] Dec. 16, 1980

[54] ELIMINATION OF STABILIZER FOR HIGH NITRILE RESINS BY USING A LATEX DEWATERING EXTRUDER FOR PRODUCT RECOVERY

[75] Inventors: William J. Miloscia, Shaker Heights; Louis R. Trott, Streetsboro, both of Ohio

[73] Assignee: Standard Oil Company, Cleveland, Ohio

[21] Appl. No.: 66,145

[22] Filed: Aug. 13, 1979

Related U.S. Application Data

[63] Continuation-in-part of Ser. No. 930,447, Aug. 2, 1978, abandoned, which is a continuation-in-part of Ser. No. 874,092, Jan. 31, 1978, abandoned.

[51] Int. Cl.² ............................................. C08L 55/02
[52] U.S. Cl. .................................. 525/316; 525/308; 525/310; 525/311; 525/312; 525/315; 528/502; 264/101; 264/349

[58] Field of Search ............... 525/308, 310, 311, 312, 525/315, 316; 528/502; 264/101, 349

[56] References Cited

U.S. PATENT DOCUMENTS

| | | | |
|---|---|---|---|
| 2,935,763 | 5/1960 | Newman et al. | 264/349 |
| 3,248,455 | 4/1966 | Harsch | 528/502 |
| 3,345,430 | 10/1967 | Simon | 528/502 |
| 3,993,292 | 11/1976 | Skidmore | 159/2 E |
| 4,103,074 | 7/1978 | Hertel | 528/487 |

Primary Examiner—Carman J. Seccuro
Attorney, Agent, or Firm—Herbert D. Knudsen; David J. Untener; Larry W. Evans

[57] ABSTRACT

Nitrile polymer solids having good stability against loss of impact strength and resin yellowing are recovered from latex with minimal or no use of stabilizers in a screw extruder.

4 Claims, No Drawings

ELIMINATION OF STABILIZER FOR HIGH NITRILE RESINS BY USING A LATEX DEWATERING EXTRUDER FOR PRODUCT RECOVERY

This application is a continuation-in-part of application Ser. No. 930,447, filed Aug. 2, 1978, now abandoned, which in turn is a continuation-in-part of application Ser. No. 874,092, filed Jan. 31, 1978, now abandoned.

BACKGROUND OF THE INVENTION

Nitrile polymers are produced by polymerizing a major portion of a mono-unsaturated nitrile, such as acrylonitrile, and optionally a minor proportion of another mono-vinyl monomer component co-polymerizable with said nitrile in an aqueous medium in the presence of a preformed diene rubber which may be a homopolymer or a copolymer of a conjugated diene monomer.

Methods of preparing such polymers are known in the art, and details of such preparations can be found in U.S. Pat. Nos. 3,426,102, 3,586,737, and 3,821,348, all of these references being incorporated herein in their entirety.

The above processes produce a reaction product in which the latex solids, or resin, must then be recovered. It is desirable to recover such solids substantially free of moisture and contaminates. It is also essential that this recovery be as economical as possible with respect to time and cost of materials used.

Many techniques are known to recover resins. U.S. Pat. Nos. 3,248,455 and 3,345,430 describe methods of partially coagulating the latex into a paste, shaping the paste into strands, and passing these strands into a heated aqueous medium. Usually such treatment is followed by drying the resin to remove moisture. U.S. Pat. No. 3,821,348 discloses an alternate method to the above wherein coagulants are not used. Both of these systems, however, require many individual processing steps to obtain a quality resin.

A possible method to eliminate or simplify this processing is by using a screw devolatilizer as found in U.S. Pat. Nos. 3,742,093 and 3,799,234. As stated in these references, the volatilization of plastic material such as polyolefins in a screw extruder is well known.

Polymers obtained in this manner are thermoplastic materials which are easily processed and can be thermoformed into a wide variety of useful products. One problem that has arisen, however, is that certain stabilizers must be added to these resins to minimize color and thermal degradation, and to improve impact strength. Such stabilizers are extremely important with respect to rubber modified polymers. U.S. Pat. Nos. 3,907,937 and 3,997,628 describe such stabilizers. Other well known stabilizers have included Polygard, an organic phosphite stabilizer-antioxidant being tri-nonyl-phenyl phosphite produced by U.S. Rubber Company, and dilauryl thiodipropionate, (DLTDP) produced by Evans Chemetics Inc. The amount of stabilizers normally added to the latex is in the range of 2-4% based on the resin polymer.

It has been discovered that monounsaturated nitrile polymers containing a preformed diene rubber can be produced having good stability against loss of impact strength and resin yellowing when processed in a screw extruder with the use of stabilizers in the range of 0-1% of the resin polymer.

SUMMARY OF THE INVENTION

The invention is in the process for recovering solids from a polymeric latex of a polymer produced by the polymerization of an unsaturated nitrile and a preformed rubber component, the improvement comprising passing said polymeric latex through a screw extruder and injecting into said polymeric latex an oxidation or thermal degradation stabilizer in an amount equal to 0-1% of the resin polymer.

It has been found that when using the above invention, impact strength and lack of resin yellowing is at least as good as those processes wherein the polymeric latex is processed in the normal manner with stabilizer.

Principal to the present invention is the use of a screw extruder rather than paste extrusion and water washing.

The screw extruder and/or devolatilizer is well known in the art, as described in U.S. Pat. No. 3,799,234. Steam may be injected in the various ports to strip the residue monomers from the latex. It is preferred that the extruder have one or more vents, preferably under vacuum, to remove the emitted vapors.

Various coagulants may be added to the latex prior to or when the latex is in the extruder. These coagulants will form a resin melt of the latex as the latex moves through the screw extruder.

As stated previously, the use of the present invention allows resin to be formed having good impact strength and lack of resin yellowing.

Impact strength of a resin can be determined by the notched Izod test, found in ASTM D256, "Impact Resistance of Plastics and Electrical Insulating Materials." The value given is in ft. lbs. per inch notch. The higher the value, the greater impact strength of the resin.

The yellowness index of plastics can be determined by using ASTM D 1925-70, "Yellowness Index of Plastics." The lower the index number, the less yellowness found in the resin.

The amount of stabilizer added to the resin to achieve suitable quality is in the range of 0-1 parts per 100 parts of resin polymer. It is preferred that no stabilizer be used, for good results can be obtained without its use. However, small quantities of stabilizer may be added with some beneficial effects.

When greater quantities of stabilizer addition is attempted, the stabilizer causes over-lubrication, and slippage of the resin in the extruder.

The resins useful in this invention are composed of polymers of an olefinically unsaturated nitrile, another monomer component copolymerizable with said olefinically unsaturated nitrile, and optionally a diene rubber.

The polymers are those produced by polymerizing a major proportion of a monounsaturated nitrile, such as acrylonitrile, and a minor proportion of another mono-vinyl monomer component copolymerizable with said nitrile in an aqueous medium, preferably in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethylbutadiene-1,3, and the like, and others. Most preferred for the purpose of this invention are butadiene and isoprene because of their ready availability and their excellent copolymerization properties.

The olefinically unsaturated nitriles, useful in the present invention are the alpha, beta-olefinically unsaturated mononitriles having the structure

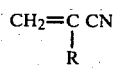

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The other monovinyl monomer component copolymerizable with the olefinically unsaturated nitriles which are useful in this invention includes one or more of the vinyl aromatic monomers, esters or olefinically unsaturated carboxylic acids, vinyl esters, vinyl ethers, alpha-olefins, and other.

The vinyl aromatic monomers include styrene, alpha-methyl styrene, the vinyl toluenes, the vinyl zylenes, and the like. Most preferred is styrene.

The esters of olefinically unsaturated carboxylic acids include those having the structure

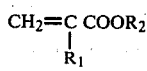

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

wherein R' and R" are alkyl groups having from 1 to 7 carbon atoms, and more specifically preferred are alpha-olefins such as isobutylene, 2-methyl butene-1, 2-methyl pentene-1,2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Polymers of particular utility in this invention and details of their methods of preparation are described in U.S. Pat. Nos. 3,426,102, 3,586,737 and 3,763,278.

The polymers useful in this invention are those prepared by the polymerization of 100 parts by weight of (A) at least 50% by weight of at least one nitrile having the structure

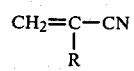

wherein R has the foregoing designation and (B) up to 50% by weight based on the combined weight of (A) and (B) of at least one member selected from the group consisting of (1) styrene, (2) an ester having the structure

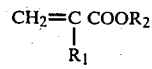

wherein $R_1$ and $R_2$ have the foregoing designations, (3) an alpha-olefin having the structure

wherein R' and R" have the foregoing designations, (4) a vinyl ether selected from the group consisting of methyl vinyl ether, ethyl vinyl ether, the propyl vinyl ethers, and the butyl vinyl ethers, and (5) vinyl acetate, in the presence of from 0 to 40 parts by weight of (c) a rubbery polymer of a conjugated diene monomer selected from the group consisting of butadiene and isoprene and optionally at least one comonomer selected from the group consisting of styrene, a nitrile monomer having the structure

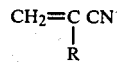

wherein R has the foregoing designation, and an ester having the structure

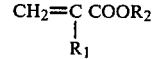

wherein $R_1$ and $R_2$ have the foregoing designations, said rubbery polymer containing from 50 to 100% by weight of polymerized conjugated diene and from 0 to 50% by weight of comonomer.

Preferably, component (A) should be present in from about 60 to 90% by weight based on the combined weight of (A) and (B) and the rubbery polymer (C) should contain more than 50% by weight of conjugated diene and more preferably from 60 to 90% by weight of the conjugated diene.

The following Examples further illustrate the invention.

COMPARATIVE EXAMPLES A–C

An acrylonitrile-rubber latex was prepared using the methods found in U.S. Pat. Nos. 3,426,102 and 3,586,737. This latex was then vacuum stripped to reduce the concentration of residue monomers.

For the comparative Examples, the latex was then combined with alum, a coagulating agent, to form a resin melt. The melt was extruded through a fine orifice and dropped into hot water. The formed strands were then passed through a series of water washes, followed by a dryer to remove moisture.

Stabilizer was added to Examples A and B in the amounts shown in the Table below. This stabilizer consisted of a mixture of Polygard and DLTDP in the ratio of 3.5:1. The percent stabilizer in the Table is in parts of stabilizer per 100 parts of dry resin polymer.

EXAMPLE 1

Latex prepared per the previous Example was fed to a 2 inch Welding Engineer's latex dewatering extruder. The extruder consists of 9 sections. Latex was fed to the second section of the extruder by a reciprocating piston pump at a rate of 440–500 lbs/hr. Alum solution was injected into the third section by a metering piston pump. Water was removed by means of a mechanical filter in the fifth section. Sections 7 and 8 each had a vacuum vent. The dry resin melt was then extruded through a die in the last section.

The Table below shows the results of these Examples.

TABLE

COMPARISON OF STABILIZER ADDITION FOR POLYMER RECOVERY

| Process | Stabilizer % | Notched Izod Ft. lbs/in | Yellowness Index |
|---|---|---|---|
| Comp. A Paste Line | 1.8 | 4.1 | 19 |
| Comp. B Paste Line | 1.125 | 3.8 | 20 |
| Comp. C Paste Line | 0 | 1.8 | 40 |
| Example 1 Screw Extruder | 0 | 4.2 | 22 |

As can readily be observed from this Table, the addition of stabilizer is necessary when the polymer is recovered using prior art means of extrusion and drying. Without stabilizer, the impact strength of the resin is decreased to less than half of the resin with stabilizer. Further, the yellowness index (the lower the number the less yellowness) has doubled for resins prepared without stabilizer.

These results can be directly compared to processing the latex through the screw extruder. Without the use of stabilizer, comparable impact strength and yellowness index numbers can be achieved.

Thus the present invention eliminates the need and associated cost for stabilizer previously thought to be critical for the production of high strength clear nitrile polymers.

Effective Temperature

The use of stabilizers in the prior art has become necessary whenever high temperatures are utilized, and more specifically whenever the polymer is melt extruded or densified. If the polymer is recovered at low temperatures, such as below 150° F., stabilizer addition is not necessary, as shown by the following example.

COMPARATIVE EXAMPLE D

The acrylonitrile-rubber latex of Comparative Example A was subjected to the same intermediate coagulation and drying of Example A, within a temperature range of 120°–150° F., but was not subjected to the melt extrusion temperature of 390° F. No stabilizer was added. The notched izod of the resin recovered was 12.0 ft-lb/in.

While the resin produced in the above comparative example does have a high izod number, this number will substantially drop when the resin is subjected to higher temperature during later processing steps, such as melt extrusion densification or final product fabrication at or above the polymer melt temperature. For this reason, the addition of stabilizer has become a necessary function.

COMPARATIVE EXAMPLE E & F

These examples, using the acrylonitrile-rubber latex of Comparative Example B, show the effect of stabilizer addition to the combined prior art processing steps of coagulation, drying and melt extrusion between a temperature range of 160°–390° F. The results are presented in Table II.

EXAMPLE 2

The latex of Example 1 was run at a temperature of 200°–360° F. through a 2 inch Welding Engineers latex dewatering extruder. The results are presented in the Table below:

TABLE II

Effect of Temperature on Polymer Recovery

| Process | Temp. °F. | Stabilizer % | Izod Ft. lb/in. | Yellowness Index |
|---|---|---|---|---|
| Comp. Ex. E | 160–390 | -0- | 1.6 | +32 |
| Comp. Ex. | 160–390. | 1.125 | 3.6 | +20 |
| Example 2 | 200–360 | -0- | 4.2 | +22 |

As can be seen above, when the resin has been subjected to temperatures above 150° F., the use of stabilizers becomes critical to achieve a suitable izod number and yellowness index. However, when the latex is recovered through a screw extruder, even better numbers are produced without the use of stabilizer.

We claim:

1. In the process for recovering solids having good stability against loss of impact strength and resin yellowing from a polymeric latex polymer wherein said polymer is composed of 100 parts by weight of the polymerization product of the monomers
   (A) at least 50% by weight of at least one nitrile having the structure

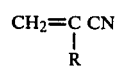

wherein R is hydrogen, a lower alkyl group having from 1 to 4 carbon atoms, or a halogen, and
   (B) up to 50% by weight based on the combined weight of (A) and (B) of at least one member selected from the group consisting of
      1. styrene,
      2. an ester having the structure

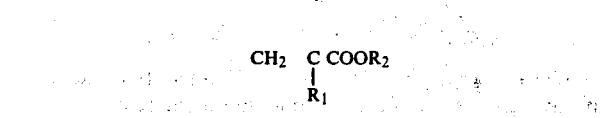

wherein $R_1$ is hydrogen, an alkyl group having from 1 to 4 carbon atoms, or a halogen, and $R_2$ is an alkyl group having from 1 to 6 carbon atoms, 3. an alpha-olefin having the structure

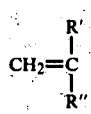

wherein R' and R" are alkyl groups having from 1 to 7 carbon atoms, 4. a vinyl ether selected from the group consisting of methyl vinyl ether, ethyl vinyl ether, the propyl vinyl ethers, and the butyl vinyl ethers, and
5. vinyl acetate, wherein said monomers are copolymerized in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure

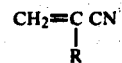

wherein R has the foregoing designation, and an ester having the structure

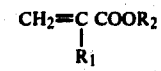

wherein $R_1$ and $R_2$ have the foregoing designations, said rubbery polymer containing from 50 to 100% by weight of polymerized conjugated diene and from 0 to 50% by weight of comonomer, the improvement comprising passing said polymeric latex through a screw extruder at a temperature above 150° F. without the use of an oxidizing or thermal degradation stabilizer.

2. The process of claim 1 wherein the unsaturated nitrile is acrylonitrile.

3. The process of claim 2 wherein (B) is styrene.

4. The process of claim 2 wherein (C) is a copolymer of butadiene and acrylonitrile.